: 3,661,766
PROCESS FOR THE UTILIZATION OF EMULSIONS OF AQUEOUS UREA SOLUTION AND NORMAL PARAFFINS
Hermann Franz, Neu Isenburg, and Max Kunert, Neu Wulmstorf, Germany, assignors to Edeleanu Gesellschaft m.b.H., Frankfurt am Main, Stresemannallee, Germany
No Drawing. Filed Apr. 16, 1970, Ser. No. 29,254
Claims priority, application Germany, Apr. 18, 1969, P 19 19 664.6
Int. Cl. C10g 43/04; C07b 21/00
U.S. Cl. 208—25                                                        7 Claims

ABSTRACT OF THE DISCLOSURE

An emulsion of normal paraffins and aqueous urea solution formed during the decomposition of a normal paraffin-urea adduct is resolved by admixing water and a chlorinated hydrocarbon solvent with the emulsion, filtering and allowing the mixture to settle whereby two phases are formed, one comprising normal paraffins and chlorinated hydrocarbon and the other comprising aqueous urea solution.

BACKGROUND OF THE INVENTION

This invention relates to the utilization of an emulsion of aqueous urea solution and normal paraffins formed in the decomposition of urea-normal paraffin adducts with water. More particularly, it relates to the resolution of an emulsion of normal paraffins and an aqueous urea solution formed in the decomposition of urea-normal paraffin adducts in a urea dewaxing process of the type wherein a chlorinated hydrocarbon solvent is admixed with the feed and a concentrated aqueous urea solution is mixed with the feed-solvent mixture to form the solid adduct.

In urea dewaxing processes normal paraffins are separated from hydrocarbon mixtures because of the ability of normal paraffins to pass within the crystalline structure of urea forming a solid adduct. After separating the adduct from the liquid components by filtration or centrifugation, it is decomposed by heat into its components in liquid form for ultimate recovery of the normal paraffins. The several processes which utilize this separation technique may be classified by the physical state of the urea forming the adduct, to wit: (1) crystalline urea is mixed with the oil containing the normal paraffins, (2) the oil is percolated through a fixed bed of crystalline urea, (3) a dilute urea solution is contacted with the oil, or (4) a concentrated urea solution is contacted with the oil. Processes employing these four techniques are described in Fritz, "Urea Adduct Processes for n-Paraffin Recovery," in "Proceedings of the Symposium on Normal Paraffins" at page 29, European Chemical News Normal Paraffins Supplement, Dec. 2, 1966.

The subject of this invention relates to a urea dewaxing process employing a concentrated urea solution for adduct formation. In this dewaxing process, the hydrocarbon mixtures are diluted with oil solvents, preferably chlorinated hydrocarbons such as dichloromethane, and brought into intimate contact with a highly concentrated aqueous solution of urea to form an adduct of urea and n-paraffins. This solid phase adduct is separated from the liquid phases by filtration and then is decomposed at elevated temperature, often aided by the addition of water, into urea and paraffin. Upon settling, several phases separate, namely, a layer of aqueous urea solution and a normal paraffin layer. A third layer consisting of an emulsion of aqueous urea solution and normal paraffins is frequently interposed between these two layers. The aqueous urea solution of the first-mentioned layer is used for obtaining further adduct. The normal paraffin layer is a valuable product. The third layer presents a disposal problem since it can neither be burned nor passed into a waste water system. Moreover, disposal by destruction would be a most unfavorable solution to the problem as the components of the emulsion are valuable substances per se. A distillation treatment of the third layer is impractical owing to the generally high boiling points of the normal paraffins contained in the emulsion. Centrifugation of the emulsion has also proved unsuccessful. A process, described in German published patent application DAS 1,273,531, is said to break the emulsion by adding liquids having specific dielectric constants. However, this process has the disadvantage that the liquids added must be recovered by distillation.

It is therefore an objective of this invention to utilize the emulsion forming the third layer. It is another objective of this invention to eliminate the disposal problem by utilizing the emulsion. It is still another objectve of this invention to utilize the said emulsion by a procedure requiring the addition of no other substances than those already being used in the prior art urea dewaxing process wherein the adduct is formed from a concentrated aqueous urea solution.

SUMMARY OF THE INVENTION

This invention achieves these objectives of utilizing emulsions of aqueous urea solution and normal paraffins formed in the decomposition urea-normal paraffin adducts during a urea dewaxing process employing a chlorinated hydrocarbon solvent as a diluent for the mixed hydrocarbon feed and a concentrated aqueous urea solution for adduct formation which comprises admixing water with the emulsion, then admixing chlorinated hydrocarbon solvent with the mixture of water and emulsion, passing the resultant mixture through a filter, allowing the filter effluent to settle and separating the several phases produced.

DESCRIPTION OF THE PREFERRED EMBODIMENTS

In accordance with the present invention which relates to a urea dewaxing process wherein a chlorinated hydrocarbon solvent is a diluent for the hydrocarbon feed and a concentrated aqueous urea solution is contacted with the solvent-feed mixture to form the normal paraffin-urea adduct, an emulsion of normal paraffins and aqueous urea solution formed during decomposition of the adduct may be resolved by admixing quantities of water and chlorinated hydrocarbon solvent with the emulsion, passing the resultant mixture through a filter, allowing the mixture to settle and separating the layers formed to yield a layer of chlorinated hydrocarbon solvent containing normal paraffins and a layer of dilute aqueous urea solution.

When this invention is incorporated into a continuous urea dewaxing process it may perform in a continuous fashion. One such continuous embodiment would comprise:

(a) introducing water into a pipe through which the emulsion is flowing,
(b) introducing a chlorinated hydrocarbon solvent into the pipe at a point downstream from the point of introduction of the water,
(c) passing the liquid mixture resulting from steps (a) and (b) through a filter,
(d) allowing the liquid mixture resulting from step (c) to settle forming two layers,
(e) separating the layers to yield a first layer comprising normal paraffins and chlorinated hydrocarbon solvent and a second layer comprising dilute aqueous urea solution.

The aqueous urea solution recovered in this process finds utilization in the urea dewaxing process. It may serve as the water used in the decomposition of the adduct or, following concentration, as the concentrated aqueous urea solution employed in the formation of the adduct. The chlorinated hydrocarbon solvent recovered and which contains a quantity of normal paraffins may serve as part of the solvent used as diluent for the hydrocarbon feed.

The filtering step is essential to insure a rapid and complete formation of two liquid layers in the settling step. A porous filter having pore sizes of $10^{-3}$ to $10^{-2}$ mm. has been found to be especially useful. In particular, a filter having sintered metal balls having pore openings of $10^{-3}$ to $10^{-2}$ mm. has proven effective.

To insure resolution of the emulsion 1 to 4 volumes of water per volume of emulsion, preferably 1.5 to 2.5 v./v. are used. Additions of the chlorinated hydrocarbon, which in the preferred embodiment is dichloromethane, should be 2 to 10 volumes of chlorinated hydrocarbon per volume of emulsion, preferably 4 to 6 v./v.

The following example serves to illustrate the invention without limiting the scope thereof.

One volume of a spindle oil containing a quantity of normal paraffins is diluted with 2 volumes of dichloromethane. The mixture is vigorously stirred at 30 to 40° C. with 1 volume of an aqueous urea solution saturated at 70° C. After about 10 minutes a urea-normal paraffin adduct is precipitated as a solid phase. The adduct is separated from the liquid phase and decomposed at 85° C. with a small addition of water. Three layers are formed. The upper layer consists of n-paraffins originally present in the spindle oil. The lower layer is an aqueous urea solution. The middle layer is an emulsion of normal paraffins and aqueous urea solution. The emulsion is drawn off through a 1½" pipe at a liquid flow rate of about 200 liters per hour. To this liquid stream 400 liters per hour of water at about 30° C. are added through a Y-piece fitted in the pipe. At a point about 1 meter downstream from the first Y-piece, 1000 liters per hour of dichloromethane having a temperature of about 30° C. are introduced into the pipe through a second Y-piece. The liquid flow rate downstream of the second Y-piece now amounts to 1600 liters per hour. This liquid stream is passed through a cartridge filter containing sintered metal balls having a pore size of $10^{-3}$ to $10^{-2}$ mm. and then passed into a settling tank where two liquid layers are formed. The upper layer is a dilute aqueous urea solution, part of which is recycled to the adduct decomposition, while the remaining portion is reconcentrated and then recycled to the adduct formation. The lower layer contains the normal paraffins and the chlorinated hydrocarbon and is used to replace part of the dichloromethane required for diluting the spindle oil feed stock.

We claim:

1. A process for resolving an emulsion of normal paraffins and aqueous urea solution which comprises:
    (a) admixing 1 to 4 volumes of water per volume of emulsion with an emulsion of normal paraffins and aqueous urea solution forming a first mixture,
    (b) admixing 2 to 10 volumes of dichloromethane per volume of emulsion with the first mixture producing a second mixture,
    (c) filtering said second mixture,
    (d) settling the filter effluent forming two layers, and
    (e) separating the phases to yield a first layer comprising normal paraffins and dichloromethane and a second layer comprising aqueous urea solution.

2. A process according to claim 1 wherein step (a) the volume ratio is 1.5 to 2.5 and in step (b) the volume ratio is 4 to 6.

3. A process according to claim 1 wherein step (c) is conducted in a porous filter having pore openings of $10^{-3}$ to $10^{-2}$ mm.

4. In a urea dewaxing process wherein a hydrocarbon mixture containing normal paraffins is admixed with a chlorinated hydrocarbon solvent producing an oil-solvent mixture and wherein said oil-solvent mixture is contacted with a concentrated aqueous urea solution forming a solid adduct of normal paraffin and urea and wherein said adduct is decomposed in the presence of water forming a first phase comprising normal paraffins, a second phase comprising aqueous urea solution and a third phase comprising an emulsion of normal paraffins and aqueous urea solution, the improvement of resolving the emulsion which comprises:
    (a) combining water with the emulsion in a ratio of 1 to 4 volumes of water per volume of emulsion,
    (b) admixing a chlorinated hydrocarbon with the mixture of water and emulsion in a ratio of 2 to 10 volumes of chlorinated hydrocarbon per volume of emulsion, said chlorinated hydrocarbon being the same chlorinated hydrocarbon admixed with the hydrocarbon mixture prior to adduct formation,
    (c) filtering the mixture of water, emulsion and chlorinated hydrocarbon,
    (d) allowing the filter effluent to settle forming two layers, and
    (e) separating the layers to yield a first layer comprising normal paraffins and chlorinated hydrocarbon and a second layer comprising aqueous solution.

5. A process according to claim 4 wherein the chlorinated hydrocarbon of step (b) is dichloromethane.

6. A process according to claim 5 where in step (a) the volume ratio is 1.5 to 2.5 and in step (b) the volume ratio is 4 to 6.

7. A process according to claim 5 where step (c) is conducted in a porous filter having pore openings of $10^{-3}$ to $10^{-2}$ mm.

References Cited

UNITED STATES PATENTS

| | | | |
|---|---|---|---|
| 3,269,935 | 8/1966 | Maas et al. | 208—25 |
| 3,071,534 | 1/1963 | Hoppe et al. | 208—25 |
| 2,719,106 | 9/1955 | Champagnat | 208—133 |
| 2,131,525 | 9/1938 | Schulze | 252—349 |
| 2,228,353 | 1/1941 | Howes | 252—349 |

HERBERT LEVINE, Primary Examiner

U.S. Cl. X.R.

260—96.5; 252—331